(12) United States Patent
Sickart

(10) Patent No.: US 7,878,087 B2
(45) Date of Patent: Feb. 1, 2011

(54) SELECTOR DEVICE FOR A TRANSMISSION

(75) Inventor: Michael Sickart, Heimsheim (DE)

(73) Assignee: Dr Ing. h.c. F. Porsche Aktiengesellschaft, Stuttgart (DE)

( * ) Notice: Subject to any disclaimer, the term of this patent is extended or adjusted under 35 U.S.C. 154(b) by 861 days.

(21) Appl. No.: 11/645,838

(22) Filed: Dec. 26, 2006

(65) Prior Publication Data

US 2007/0144294 A1 Jun. 28, 2007

(30) Foreign Application Priority Data

Dec. 24, 2005 (DE) ............ 10 2005 062 298

(51) Int. Cl.
*B60K 20/00* (2006.01)
*G05G 5/00* (2006.01)

(52) U.S. Cl. ................ 74/473.18; 74/473.21

(58) Field of Classification Search ........... 74/473.1, 74/473.12, 473.18, 473.21, 473.3, 473.34, 74/473.35, 471 XY
See application file for complete search history.

(56) References Cited

U.S. PATENT DOCUMENTS

| | | | |
|---|---|---|---|
| 6,046,673 A | 4/2000 | Michael et al. | |
| 6,067,492 A | 5/2000 | Tabata et al. | |
| 6,698,308 B2 | 3/2004 | Vogel et al. | |
| 6,699,155 B2 * | 3/2004 | Nagasaka | 477/94 |
| 6,904,822 B2 * | 6/2005 | Meyer et al. | 74/335 |
| 7,028,575 B2 | 4/2006 | Ehrmaier et al. | |
| 7,167,085 B2 * | 1/2007 | Meyer et al. | 340/456 |
| 2001/0025536 A1 * | 10/2001 | Nishimura | 74/335 |
| 2002/0166399 A1 * | 11/2002 | Nagasaka et al. | 74/335 |
| 2004/0216549 A1 * | 11/2004 | Shiomi et al. | 74/473.12 |
| 2005/0081671 A1 * | 4/2005 | Oda et al. | 74/473.18 |
| 2005/0239596 A1 | 10/2005 | Giefer et al. | |
| 2007/0137363 A1 * | 6/2007 | Aso et al. | 74/473.18 |

FOREIGN PATENT DOCUMENTS

| | | |
|---|---|---|
| DE | 197 14 459 A1 | 10/1998 |
| DE | 197 14 495 A1 | 10/1998 |
| DE | 197 37 296 C2 | 3/1999 |
| DE | 101 12 698 A1 | 9/2002 |
| DE | 102 06 985 A1 | 8/2003 |
| DE | 20 2004 004 151 U1 | 7/2004 |
| EP | 0 416 227 A1 | 3/1991 |
| JP | 10100723 A | 4/1998 |
| JP | 2002276782 A | 9/2002 |
| JP | 2002310291 A | 10/2002 |
| WO | 2004109159 A1 | 12/2004 |

* cited by examiner

*Primary Examiner*—Thomas R Hannon
*Assistant Examiner*—James Pilkington

(57) ABSTRACT

A selector device for an automated or automatic transmission, in particular of a motor vehicle, has a selector lever for selecting automatic shift stages and gears of the transmission. It being possible to move the selector lever from a stable initial position into a plurality of directly adjacent labile selector positions for selecting the automatic shift stages and the gears, from which labile selector positions, the selector lever automatically returns into the initial position. The selector device further has a display for visualizing the currently engaged gear and/or the currently activated automatic shift stage. To increase operating comfort, the selector lever can also be moved from the initial position into a stable rest position, from which the selector lever can be moved only in the direction of the initial position.

20 Claims, 4 Drawing Sheets

SELECTOR DEVICE FOR A TRANSMISSION

CROSS-REFERENCE TO RELATED APPLICATION

This application claims the priority, under 35 U.S.C. §119, of German application DE 10 2005 062 298.4, filed Dec. 24, 2005; the prior application is herewith incorporated by reference in its entirety.

BACKGROUND OF THE INVENTION

Field of the Invention

The present invention relates to a selector device for an automated or automatic transmission, in particular of a motor vehicle.

A transmission of this type is known, for example, from published, European patent application EP 0 416 227 A1 and has a selector lever for selecting automatic shift stages and gears of the transmission. It being possible to move the selector lever from a stable initial position into a plurality of directly adjacent labile selector positions for selecting the automatic shift stages and the gears, from which labile selector positions the selector lever automatically returns into the initial position. A display is also provided which serves to visualize the currently engaged gear and/or the currently activated automatic shift stage. The known selector device contains two selector gates which intersect in the stable initial position and each have one of the labile selector positions at each side of the stable initial position. A transmission controller assigns the individual automatic shift stages to the initial position and the selector positions, it being possible to select the automatic shift stages by deflecting or tipping the selector lever into the labile selector positions. The automatic shift stages also include a manual shift stage in which it is possible to shift between the individual gears of the transmission by tipping the selector lever forwards and backwards. The automatic shift stages also contain a park position in which a parking lock of the transmission is activated.

A further selector device is known from German patent DE 197 37 296 C2, in which selector device, the selector lever is adjustable in a selector gate which has four stable selector positions disposed adjacent to one another. The stable selector positions are assigned to in each case one automatic shift stage of the transmission. One of the outer stable selector positions, configured as the manual shift stage, is adjoined by three labile selector positions, one of which is configured as a forward shift stage and is disposed in the selector gate. The two other labile selector positions are disposed at each side of the stable manual selector position in a transverse gate which intersects the selector gate in the manual selector position. The two labile selector positions of the transverse gate serve to shift the gears up and down. The other stable selector positions of the selector gate are an idle shift stage, a reverse shift stage and a park shift stage.

German Utility Model DE 20 2004 004 151 U1 teaches a selector device in which a selector lever is adjustable in an automatic selector gate to shift between automatic shift stages, and can be moved via a transverse gate into a tip-action selector gate in which it is adjustable in order to shift between transmission gears. In the tip-action selector gate, the selector lever has one stable selector position to which the selector lever automatically returns from all the labile selector positions of the three gates.

A selector device in which a selector lever can be moved via a transverse gate from an automatic selector gate into a tip-action selector gate is likewise known from published, non-prosecuted German patent application DE 197 14 459 A1. Here, the two intersecting points between the three gates each form stable selector positions, while the remaining selector positions are unstable. The selector lever automatically returns from the unstable selector positions into the respectively adjacent stable selector position.

A further selector device is known from published, non-prosecuted German patent application DE 102 06 985 A1 (corresponding to U.S. patent publication No. 2003/0172763), in which selector device a selector lever can be adjusted into two selector gates, which are connected to one another by a transverse gate, in order to select transmission gears or automatic shift stages. The known selector device is monostable and has only one stable selector position for the selector lever. To select a transmission gear or an automatic shift stage, the selector lever is deflected manually out of its stable selector position in one or the other selector gate into the respective desired selector position. The selector lever subsequently returns into the stable selector position automatically after being released from any of the possible deflected positions.

SUMMARY OF THE INVENTION

It is accordingly an object of the invention to provide a selector device for a transmission which overcomes the above-mentioned disadvantages of the prior art devices of this general type, which is distinguished in particular by being easy to handle and preferably by a high degree of operational safety.

With the foregoing and other objects in view there is provided, in accordance with the invention, a selector device for an automated or automatic transmission having automatic shift stages and gears. The selector device contains a selector lever for selecting the automatic shift stages and the gears of the transmission. It being possible to move the selector lever from a stable initial position into a plurality of directly adjacent labile selector positions for selecting the automatic shift stages and the gears. From the labile selector positions, the selector lever automatically returns into the stable initial position. The selector lever can also be moved from the stable initial position into a stable rest position, and from the stable rest position the selector lever can be moved only in a direction of the stable initial position. A display is provided for visualizing a currently engaged gear and/or a currently activated automatic shift stage.

The invention is based on the general concept of configuring the selector lever to be adjustable between two stable selector positions, specifically the initial position and a rest position. It being possible to move the selector lever into a plurality of directly adjacent labile selector positions only from the initial position. This makes it easily possible to assign the stable rest position a transmission function which is decoupled from normal driving operation. This results in the selector device being particularly easy to operate and having an increased degree of operational safety.

The rest position is expediently assigned a park shift stage of the transmission, in which a parking lock of the transmission is activated. As a result of the rest position being assigned exclusively the park function and the initial position being assigned all the driving functions of the transmission, it is therefore possible for the vehicle driver to intuitively make a clear distinction optically and haptically between the parking function and the driving functions, increasing the operational safety of the transmission and at the same time simplifying its operation.

In one preferred embodiment, a safety button can be provided which, in the non-actuated state, secures the selector lever, which has been adjusted into the rest position, in the rest position and permits the selector lever to be moved out of the rest position only in the actuated state. This measure makes it possible to prevent an inadvertent movement of the selector lever from the rest position into the initial position, increasing the operational safety of the selector device.

In one refinement, the safety button can be configured such that, in the actuated state, it secures the selector lever, which has been adjusted into the initial position, in the initial position, and permits the selector lever to be adjusted into the adjacent labile selector positions only in the non-actuated state. This measure also increases the operational safety and the actuating comfort of the transmission, since it is not possible to inadvertently deflect the selector lever into one of the labile selector positions when moving the selector lever from the rest position into the initial position.

A further increase in comfort and increase in operational safety can be achieved in that the safety button only permits the selector lever to be moved from the initial position into the rest position in the actuated state. This prevents an inadvertent movement of the selector lever into the rest position during driving operation.

It is self-evident that the features stated previously and those which are yet to be explained can be used not only in the respectively specified combination but also in other combinations or individually without departing from the scope of the present invention.

Preferred exemplary embodiments of the invention are illustrated in the drawings and are explained in more detail in the following description, with identical reference symbols denoting identical or similar or functionally identical components.

Other features which are considered as characteristic for the invention are set forth in the appended claims.

Although the invention is illustrated and described herein as embodied in a selector device for a transmission, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
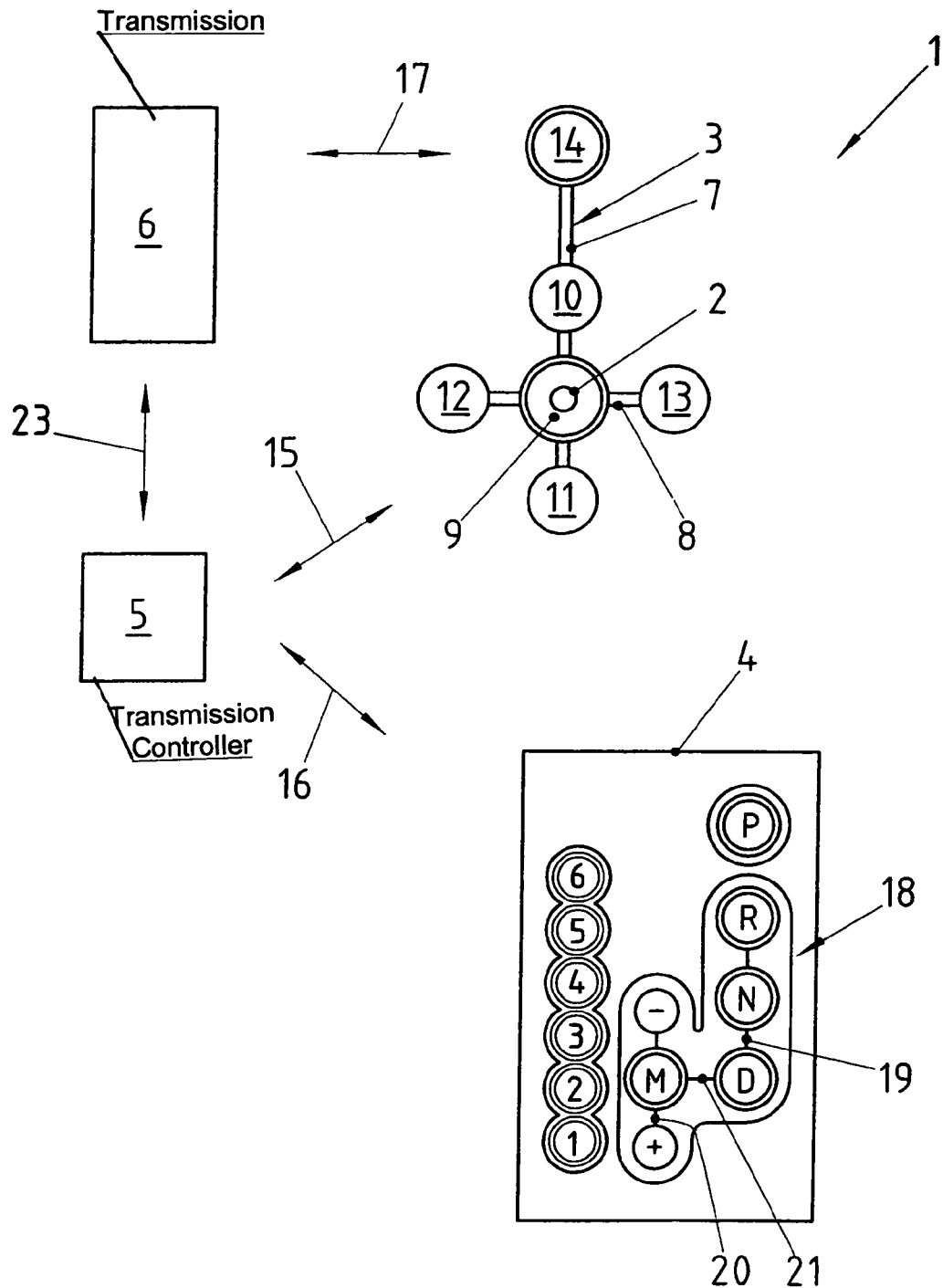
FIG. 1 is a simplified diagrammatic, illustration of a selector-plan of a selector device according to the invention.

Referring now to the figures of the drawing in detail and first, particularly, to FIG. 1 thereof, there is shown a selector device 1, according to the invention, which contains a selector lever 2, which is adjustable in a selector gate configuration 3, a display 4, and a transmission controller 5. The selector device 1 serves to actuate an automated or automatic transmission 6, preferably of a motor vehicle.

The selector gate configuration 3, which can also be referred to as the real selector gate configuration, contains a first selector gate 7 and a second selector gate 8 which intersects the first selector gate 7. In an installed state, the first selector gate 7 is preferably aligned parallel to a vehicle longitudinal direction and is therefore also referred to in the following text as the longitudinal gate 7. In contrast, the second selector gate 8 is preferably aligned transversely to the vehicle longitudinal direction, and is therefore also referred to in the following text as the transverse gate 8. The longitudinal gate 7 and the transverse gate 8 are preferably perpendicular to one another. The real selector gate configuration 3 is configured such that it provides one stable initial position 9, and a plurality of labile selector positions 10 to 13, for the selector lever 2. The labile selector positions 10 to 13 are disposed directly adjacent to the stable initial position 9 and are characterized in that the selector lever 2 automatically returns to the initial position 9 after having been deflected from the stable initial position 9 into one of the labile selector positions 10 to 13. The selector device 1 is provided with corresponding return measures for this purpose. The initial position 9 is disposed centrally with respect to the selector positions 10 to 13. In the preferred installed situation shown, the selector lever 2 must be deflected from the initial position 9 forward to be moved into the selector position 10, rearward to be moved into the selector position 11, left to be moved into the selector position 12 and right to be moved into the selector position 13. The left selector position 12 and the right selector position 13 are therefore situated in the transverse gate 8 to each side of the initial position 9, while the forward selector position 10 and the rear selector position 11 are disposed in the longitudinal gate 7 to each side of the initial position 9.

The selector gate configuration 3 also contains a further stable selector position, referred to as the rest position 14, into which the selector lever 2 can be moved from the initial position 9. The stable rest position 14 is likewise disposed in the longitudinal gate 7, specifically at the end thereof. Since no further transverse gate is present, the selector lever 2 can be moved out of the rest position 14 in only one direction, specifically in the direction of the initial position 9. In FIG. 1, stable selector positions are symbolized by double circles, while labile selector positions are illustrated by single circles.

The transmission controller 5 assigns automatic shift stages and/or gears of the transmission 6 to the stable initial position 9 and to the labile selector positions 10 to 13. For this purpose, an electronic operative connection 15, indicated by a double arrow, is provided between the transmission controller 5 and the selector gate configuration 3. The transmission controller 5 is additionally connected by an electronic operative connection 16 to the display 4. The display 4 serves to visualize the currently engaged gear and/or the currently activated automatic shift stage. The display 4 additionally serves here to visualize all the possible gears and automatic shift stages. The transmission 6 contains, for example, a forward shift stage D, an idle shift stage N and a reverse shift stage R as automatic shift stages. A manual shift stage M is additionally provided here, in which it is possible to select the individual gears (1) to (6) of the transmission 6 by deflecting the selector lever 2 into adjacent selector positions for shifting down, a so-called downshift position, characterized by a minus sign (−), and, for shifting up, a so-called upshift position, characterized by a plus sign (+).

The selector positions, transmission gears and automatic shift stages are electronically assigned to the initial position 9 and to the adjacent four labile selector positions 10 to 13 by the transmission controller 5. Here, the transmission controller 5 is coupled in a conventional way, for example by an electronic operative connection 23 as indicated by a double arrow, to the transmission 6.

The transmission 6 additionally contains a park shift stage P, in which a parking lock of the transmission 6 is activated. The park shift stage P is assigned to the stable rest position 14. According to a preferred embodiment of the present invention, the park shift stage P is assigned to the rest position 14 not electronically by the transmission controller 5 but rather mechanically. A corresponding mechanical operative connection 17 between the rest position 14 and the transmission 6 is symbolized in FIG. 1 by a double arrow. The mechanical operative connection 17 is provided, for example, by a cable pull. The parking lock of the transmission 6 can therefore be activated mechanically by a positive coupling between the transmission 6 and the selector lever 2 as the selector lever 2 is moved into the rest position 14, with the adjusting movement of the selector lever 2 providing the drive required for this purpose.

The selector device 1 preferably contains precisely two stable selector positions, specifically the initial position 9 and the rest position 14, and precisely four labile selector lever positions 10 to 13. It is possible to select all of the gears and automatic shift stages of the transmission 6 by the total of 6 selector positions 9 to 14.

In order to simplify the operation of the selector device 1 for the user, the transmission controller 5 simulates a virtual selector gate configuration 18 which is visualized for the user by the display 4. The virtual selector gate configuration 18 contains two parallel selector gates, specifically an automatic selector gate 19 for selecting the automatic shift stages and a tip-action selector gate 20 for selecting the gears. A connecting gate 21 is also provided which extends transversely to the two selector gates 19, 20 and connects these to one another. A plurality of virtual stable selector gate positions are simulated in the automatic selector gate 19, the virtual stable selector gate positions each being assigned one of the automatic shift stages, in this case the forward shift stage D, the reverse shift stage R and, in between, the idle shift stage N. In contrast, the tip-action selector gate 20 contains only one virtual stable selector gate position which is assigned the manual shift stage M. The tip-action selector gate 20, however, additionally contains two virtual labile selector gate positions on either side of the manual shift stage M, to which virtual labile selector gate positions are assigned the upshift position (+) and the downshift position (−). Here, the connecting gate 21 is disposed such that it virtually connects the manual shift stage M to the forward shift stage D. The display 4 also visualizes the real stable rest position 14 which is assigned the park shift stage P. The display 4 preferably additionally visualizes the selectable forward gears of the transmission 6. In the other figures, the respectively activated automatic shift stage and the respectively engaged transmission gear are symbolized by a ring filling in the respective double circle.

A movement of the selector lever 2 from the rest position 14 to the initial position 9 and vice versa is explained in more detail in the following text with reference to FIGS. 2A to 5C.

Figure 2A:
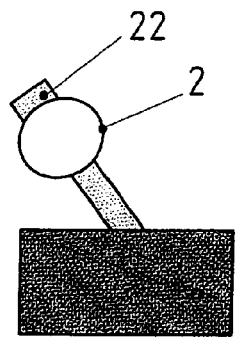
FIGS. 2A, 3A, 4A, and 5A are diagrammatic side views of the selector lever in different positions.
Figure 2B:
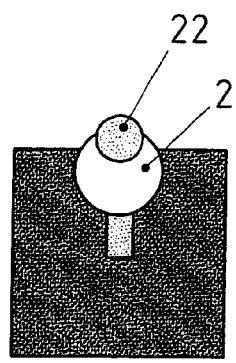
FIGS. 2B, 3B, 4B, and 5B are diagrammatic plan views of the selector lever in different positions.
Figure 2C:
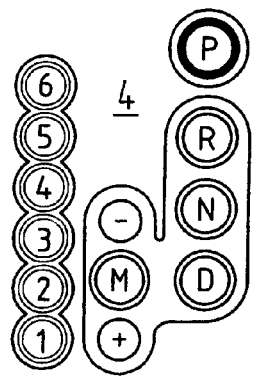
FIGS. 2C, 3C, 4C, and 5C are diagrammatic illustrations of an associated display showing the different selector positions.

In FIGS. 2A to 2C, the selector lever 2 is in the rest position 14. The rest position 14 is assigned the park shift stage P, which is signaled on the display 4 by a corresponding highlight. In the preferred embodiment shown here, the selector device 1 is additionally provided with a safety button 22 which, in the embodiment shown here, is integrated into or is formed or disposed on the selector lever 2. In the state in FIGS. 2A to 2C, the safety button 22 is not actuated. The safety button 22 is configured such that, in its non-actuated state, the selector lever 2, which has been adjusted into the rest position 14, is secured in the rest position 14 and is therefore immobile. The park shift stage P is therefore effectively secured.

Figure 3A:
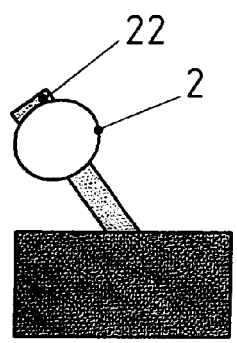
Figure 3B:
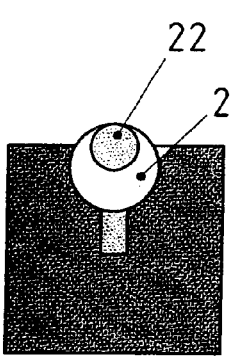
Figure 3C:
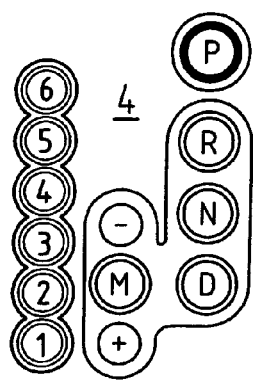

In FIGS. 3A to 3C, the safety button 22 is actuated, for example by being depressed. In its actuated state, the safety button 22 releases the selector lever 2, so that the latter can be moved out of the rest position 14. The park shift stage P and therefore the parking lock of the transmission 6 remain active, however, if the safety button 22 is actuated when the selector lever 2 is in the rest position 14.

Figure 4A:
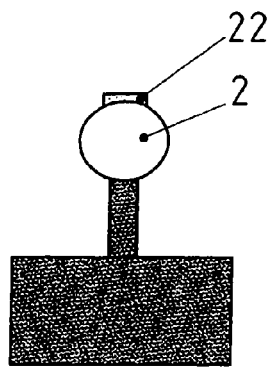
Figure 4B:
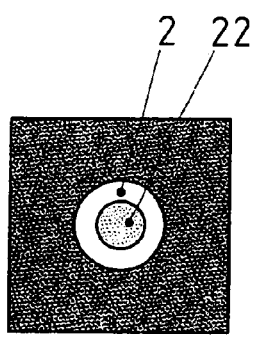
Figure 4C:
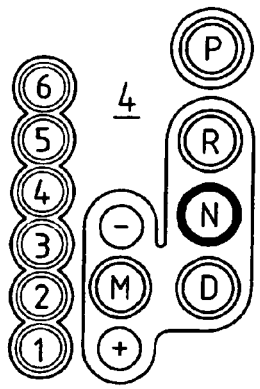

FIGS. 4A to 4C show the selector lever 2 having been adjusted into the initial position 9 with the safety button 22 actuated. The safety button 22 is configured here such that, in the actuated state, it secures the selector lever 2, which has been adjusted into the initial position 9, in the initial position 9, specifically such that it cannot be moved into the adjacent labile selector positions 10 to 13. When the safety button 22 is actuated, the selector lever 2 can be adjusted only between the rest position 14 and the initial position 9. As can be gathered from FIG. 4C, the transmission controller 5 automatically activates the idle shift stage N when the selector lever 2 is moved from the rest position 14 into the initial position 9.

Figure 5A:
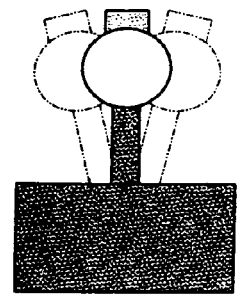
Figure 5B:
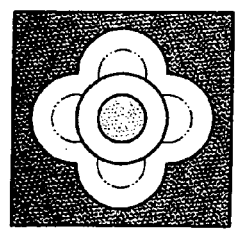
Figure 5C:
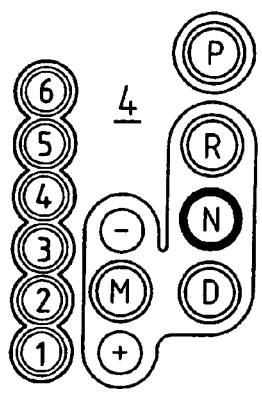
Figure 6:
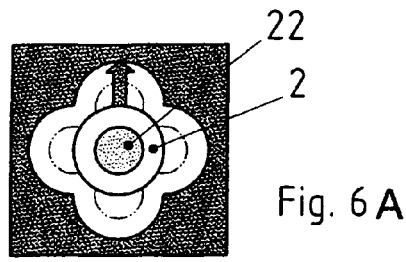
FIGS. 6A, 7A, 8A and 9A are diagrammatic plan views showing the selector lever in various actuating directions.
FIGS. 6B, 7B, 8B and 9B are diagrammatic illustrations showing the associated display of the selector lever position.
Figure 7:
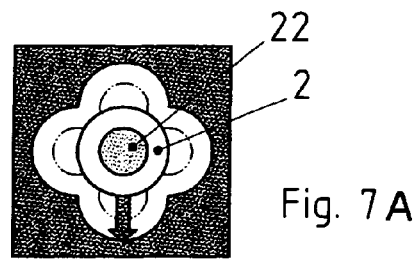
Figure 6:
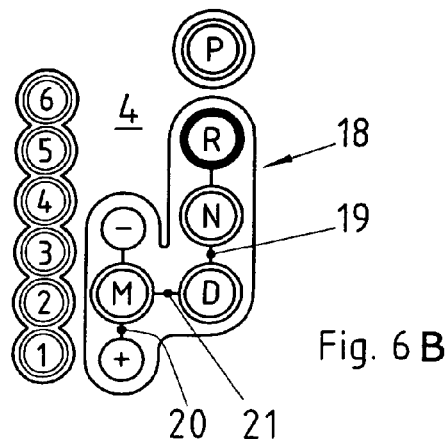
Figure 7:
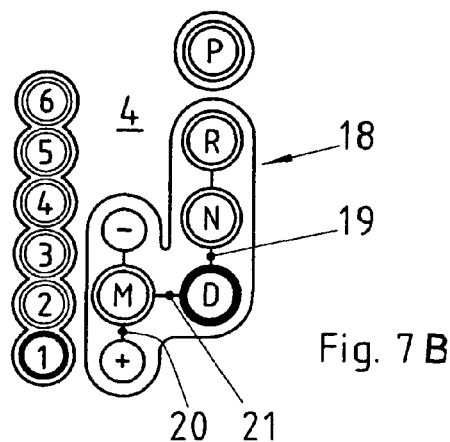
Figure 8:
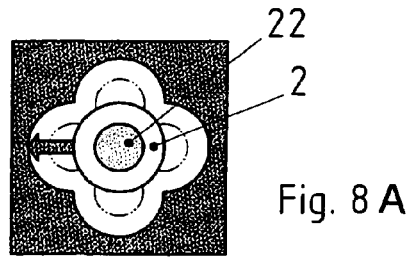
Figure 9:
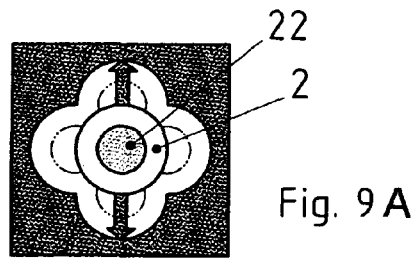
Figure 8:
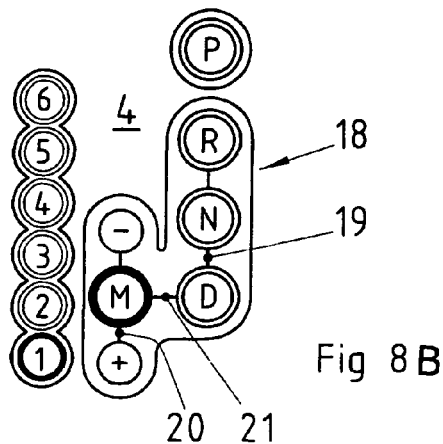
Figure 9:
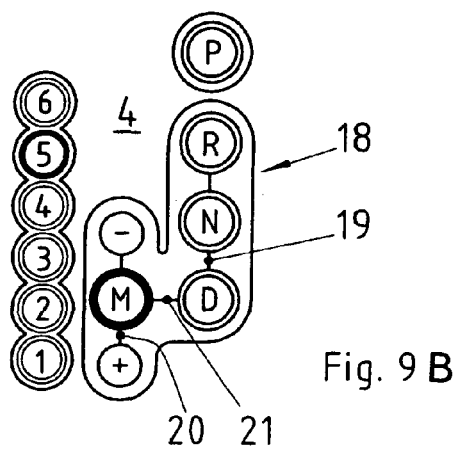

The selector lever 2 can be deflected from its initial position 9 into the labile selector positions 10 to 13, but no longer into the stable rest position 14, only once the safety button 22 is not actuated after the selector lever 2 has been moved into the initial position 9 corresponding to FIGS. 5A to 5C.

It is possible to provide a further safety configuration, in the form of a locking device (not shown in any more detail here), for the movement of the selector lever 2 from the rest position 14 into the initial position 9. The locking device locks the selector lever 2 in the rest position 14 as long as an ignition key of a vehicle equipped with the transmission 6 is inserted in an ignition lock and/or as long as the ignition key in the ignition lock is in a removal position and/or as long as a service brake of the vehicle is not actuated. In other words, the selector lever 2 can for example only be moved from the rest position 14 into the initial position 9 if an ignition key is disposed in the ignition lock, is rotated out of the removal position and if the vehicle driver actuates the service brake.

If the selector lever 2 is successfully moved from the rest position 14 into the initial position 9, the idle shift stage N is activated. The selector lever 2 can then be deflected forward, rearward, to the left and to the right into the corresponding labile selector positions 10 to 13. The transmission controller 5 assigns the deflection of the selector lever 2, as a function of the movement direction of the selector lever deflection, to a movement of the selector lever 2 in the virtual selector gate configuration 18 in the corresponding direction. The functionality of the selector device 1 is explained in more detail in the following text on the basis of FIGS. 6A to 9B, with a plurality of examples.

In the initial state, the selector lever 2 is in the real initial position 9, and is in the idle shift stage N within the virtual selector gate configuration 18. Corresponding to the virtual automatic selector gate 19, only a deflection of the selector lever 2 into the forward selector position 10 and into the rear selector position 11 leads to a shift process, while deflections to the left and the right are ignored. In order to avoid critical situations for the transmission 6, an additional safety configuration can be provided which is configured such that the transmission controller 5 also ignores a deflection forward and a deflection rearward as long as the idle shift stage N is active and the service brake of the vehicle is not actuated. Therefore, when the idle shift stage N is active, a shift into another automatic shift stage by deflecting the selector lever 2 into one of the labile selector positions 10 to 13 is only possible if the service brake of the vehicle is actuated.

In FIG. 6A, the selector lever 2 is deflected forward into the labile forward selector position 10. This causes the transmission controller 5 to activate the reverse shift stage R. The selector lever 2 in the virtual automatic selector gate 19 is correspondingly adjusted as a result, as can be gathered from the display 4 in FIG. 6B.

If, however, the selector lever 2 is deflected into the rear selector position 11 as per FIG. 7A, the transmission controller 5, proceeding from the idle shift stage N, generates a shift into the forward shift stage D. Again, the active selector state or the current position of the selector lever 2 within the virtual selector gate configuration 18 can be gathered from the display 4, as per FIG. 7B. The first transmission gear is automatically engaged, as can likewise be seen in the display 4, as a result of the forward shift stage D being activated proceeding from the idle-shift stage N.

If the selector lever 2 in the virtual automatic selector gate 19 is in the forward shift stage D, it can be moved corresponding to FIG. 8A via the virtual connecting gate 11 into the virtual tip-action gate 20 and specifically there into the manual shift stage M, as can again be gathered from the display 4 corresponding to FIG. 8B, by a deflection into the left selector position 12. Here, the currently engaged transmission gear is not changed as the manual shift stage M is activated. In the example, the first gear therefore remains engaged.

It is then possible, as in FIG. 9A, for the selector lever 2 to be deflected within the virtual tip-action gate 20 by tipping the selector lever 2 forward and backward into the labile forward selector position 10 and into the labile rear selector position 11. This results in step-by-step upshifting and downshifting through the transmission gears. In the example shown in FIG. 9B, the 5$^{th}$ gear is engaged.

It is notable that, despite there being different virtual stable selector positions within the virtual selector gates 19, 20, the selector lever 2 in reality always assumes only the stable initial position 9.

I claim:

1. A selector device for an automated or automatic transmission having automatic shift stages and gears, the selector device comprising:
    a selector lever for selecting the automatic shift stages and the gears of the transmission, it being possible to move said selector lever from a stable initial position into a plurality of directly adjacent labile selector positions for selecting the automatic shift stages and the gears; from the labile selector positions said selector lever automatically returning into the stable initial position;
    only two stable selector positions being provided as the stable initial position and a stable rest position;
    the plurality of labile selector positions being precisely four labile selector positions disposed adjacent to the stable initial position;
    two of said labile selector positions which are adjacent to the stable initial position being disposed in a first selector gate being a longitudinal gate aligned parallel to a vehicle longitudinal axis;
    a further two of said labile selector positions which are adjacent to the stable initial position being disposed in a second selector gate being a transverse gate aligned transversely to the vehicle longitudinal axis;
    said first selector gate being disposed perpendicularly to said second selector gate;
    the stable rest position being disposed at one end of said first selector gate; said selector lever also being movable from the stable initial position into the stable rest position; from the stable rest position said selector lever can only be moved along the longitudinal gate to the stable initial position; and
    a display for visualizing a currently engaged gear and/or a currently activated automatic shift stage.

2. The selector device according to claim 1, further comprising a safety button which, in a non-actuated state, secures said selector lever, which has been adjusted into the stable rest position, in the stable rest position and permits said selector lever to be moved out of the stable rest position only in an actuated state of said safety button;
    said safety button, in the actuated state, secures said selector lever, which has been adjusted into the stable initial position, in the stable initial position such that said selector lever can only be adjusted into one of the adjacent labile selector positions in the non-actuated state;
    said safety button only permitting said selector lever to be moved from the stable initial position into the stable rest position in the actuated state; and
    said safety button being formed on or is integrated into said selector lever.

3. The selector device according to claim 1, wherein:
    the transmission has a parking brake, and when said selector lever is adjusted into the stable rest position, the parking brake of the transmission is activated; and
    the parking brake is activated mechanically by an adjusting movement of said selector lever as said selector lever is moved into the stable rest position.

4. The selector device according to claim 1, further comprising a locking device for locking said selector lever, which has been adjusted into the stable rest position, in the stable rest position as long as at least one of the following conditions is met:
    an ignition key of a vehicle equipped with the transmission is not in an ignition lock;
    the ignition key is in the ignition lock in a removal position; or
    a service brake of a vehicle is not actuated.

5. The selector device according to claim 1, further comprising a transmission controller for assigning the automatic shift stages to the labile selector positions and configured such that said transmission controller ignores deflections of said selector lever into one of said labile selector positions stages if a currently activated automatic shift stage is an idle shift stage and if a service brake of a vehicle equipped with the transmission is not actuated.

6. The selector device according to claim 1, further comprising a transmission controller for assigning automatic shift stages to the labile selector positions and is configured such that, when an idle selector position is currently activated, said transmission controller only takes into consideration deflections of said selector lever into one of said labile selector positions if a deflection is into a forward selector position or a rear selector position.

7. The selector device according to claim 1, further comprising a safety button which, in a non-actuated state, secures said selector lever, which has been adjusted into the stable rest position, in the stable rest position and permits said selector lever to be moved out of the stable rest position only in an actuated state.

8. The selector device according to claim 1, further comprising a safety button which, in an actuated state, secures said selector lever, which has been adjusted into the stable initial position, in the stable initial position such that said selector lever can only be adjusted into the adjacent labile selector positions in a non-actuated state.

9. The selector device according to claim 1, further comprising a safety button which only permits said selector lever to be moved from the stable initial position into the stable rest position in an actuated state.

10. The selector device according to claim 1, further comprising a safety button being formed on or integrated into said selector lever.

11. The selector device according to claim 1, wherein the transmission has a parking brake, and when said selector lever is adjusted into the stable rest position, the parking brake of the transmission is activated.

12. The selector device according to claim 1, wherein the transmission has a parking brake and the parking brake is activated mechanically by an adjusting movement of said selector lever as said selector lever is moved into the stable rest position.

13. The selector device according to claim 1, wherein the selector device is configured for a motor vehicle.

14. The selector device according to claim 1, further comprising a transmission controller for assigning the automatic shift stages and the gears to the labile selector positions and electronically activating the gear or automatic shift stage selected in each case;
    said transmission controller simulating a virtual selector gate configuration which has an automatic selector gate for selecting the automatic shift stages and, parallel thereto, a tip-action selector gate for selecting the gears and a connecting gate running transversely to said tip action and automatic selector gates;
    said automatic selector gate has a plurality of virtual stable selector gate positions which are each assigned one of the automatic shift stages;
    said virtual stable selector gate positions of said automatic selector gate include a forward shift stage, a reverse shift stage, and an idle shift stage disposed in-between said forward shift stage and said reverse shift stage;
    the tip-action selector gate has one virtual stable selector gate position, which is assigned a manual shift stage, and two directly adjacent virtual labile selector gate positions to which are assigned an upshift position and a downshift position for selecting the gears;
    the connecting gate has two virtual stable selector gate positions to which in each case one of the automatic shift stages is assigned; and
    said virtual stable selector gate positions of said connecting gate are the manual shift stage of the tip-action selector gate and the forward shift stage of the automatic selector gate.

15. The selector device according to claim 14, wherein:
    said display visualizes the virtual selector gate configuration; and
    a movement of said selector lever in a movement direction from the stable initial position into one of the labile selector positions results in a shift of the selector lever from its current virtual selector gate position into that virtual selector gate position which is directly adjacent in a same movement direction.

16. The selector device according to claim 1, further comprising a transmission controller for assigning the automatic shift stages and the gears to the labile selector positions and electronically activating the gear or automatic shift stage selected in each case.

17. The selector device according to claim 16, wherein said transmission controller simulates a virtual selector gate configuration which has an automatic selector gate for selecting the automatic shift stages and, parallel thereto, a tip-action selector gate for selecting the gears, and a connecting gate running transversely to the selector gates.

18. The selector device according to claim 17, wherein said automatic selector gate has a plurality of virtual stable selector gate positions which are each assigned one of the automatic shift stages, and said virtual stable selector gate positions of the automatic selector gate include a forward shift stage, a reverse shift stage, and an idle shift stage disposed in-between said forward shift stage and said reverse shift stage.

19. The selector device according to claim 17, wherein said tip-action selector gate has one virtual stable selector gate position, which is assigned a manual shift stage, and two directly adjacent virtual labile selector gate positions to which are assigned an upshift position and a downshift position for selecting the gears.

20. The selector device according to claim 17, wherein said connecting gate has two virtual stable selector gate positions to which in each case one of the automatic shift stages is assigned, and the virtual stable selector gate positions of the connecting gate are a manual shift stage of the tip-action selector gate and a forward shift stage of the automatic selector gate.

* * * * *